Figure 1:
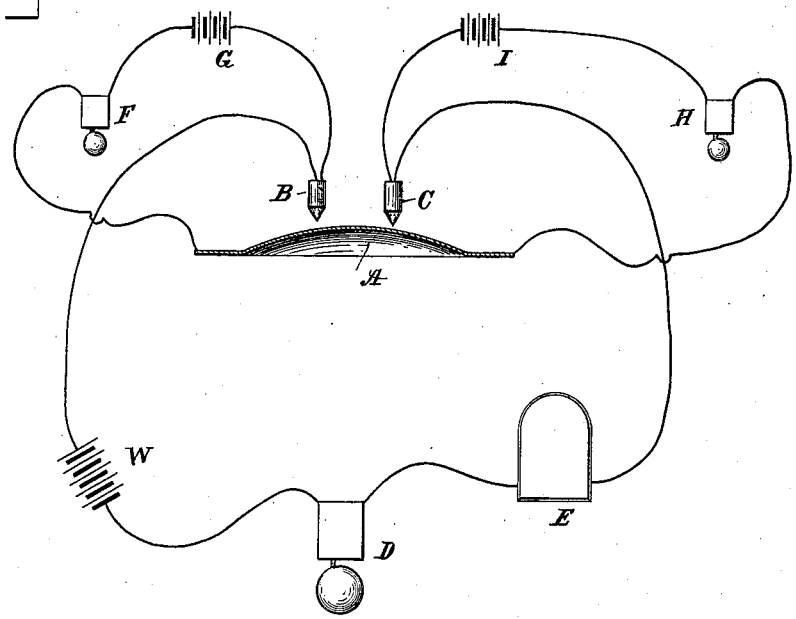

(No Model.)

J. W. FROST.
THERMOSTAT AND CIRCUIT THEREFOR.

No. 563,475. Patented July 7, 1896.

Witnesses.
John F. Nelson
Frank L. Blanchard

Inventor.
Joseph W. Frost
By his attorney,
G. H. Stockbridge

UNITED STATES PATENT OFFICE.

JOSEPH W. FROST, OF NEW YORK, N. Y.

THERMOSTAT AND CIRCUIT THEREFOR.

SPECIFICATION forming part of Letters Patent No. 563,475, dated July 7, 1896.

Application filed March 28, 1890. Serial No. 345,762. (No model.)

*To all whom it may concern:*

Be it known that I, JOSEPH W. FROST, a citizen of the United States, residing at New York, in the county of New York and State of New York, have invented certain new and useful Improvements in Thermostats and Circuits Therefor; and I do hereby declare the following to be a full, clear, and exact description of the invention, such as will enable others skilled in the art to which it appertains to make and use the same.

My invention is concerned with the construction of a new form of electrical thermostat such as is employed in a fire-alarm circuit to indicate a rise of temperature beyond a certain predetermined degree.

One of the objects of my invention is to prevent false alarms in such a circuit by the jarring of the support to which the thermostat is attached or by malicious interference with the thermostat.

Another object of the invention is to provide means whereby a distinct alarm will be sent in when the thermostat is tampered with or is affected by a jar or when it is subjected to an undue heat, even though the heat be not of such a degree as would be caused by an actual conflagration. In other words, it having been found desirable to know when an abnormal degree of heat is present where the thermostat is located, or when the thermostat has been jarred into contact or forced into contact by a malicious handling, I have directed my attention to providing the means whereby these disturbances may be made known.

In carrying out my invention I employ a thermostat of such a character that it is necessary to close or break contact at two points before the main or fire alarm will be sounded. At the same time a distinct and separate alarm is given when contact is made or broken at either point. The contacts are so arranged, moreover, that one will, in the natural operation of the thermostat, be closed or broken before the other. In the preferred form of thermostat I use a concavo-convex disk as the expansible portion or element of my thermostat, and I place behind the disk a pair of contact-pieces, one of which is located nearer to the disk than the other. It is evident that the disk in expanding must first come into contact with the nearer contact-piece and then with the farther piece in order to complete the fire-alarm circuit. It is also evident that with such a construction or arrangement of parts it is not likely that a jarring of the support to which the thermostat is attached will cause the disk to touch both points at once. In fact, the relations are such that the disk having come into contact with one of the contact-pieces is, by reason of that circumstance, prevented mechanically from making contact with the second contact-piece, except under a gradual expansion of the disk, such as would be caused, for example, by an increase in the temperature in the neighborhood of the thermostat. The same conditions apply to an operation of the disk by means of a blow either of the hand or of a hard instrument. Moreover, as will be seen, even a constant pushing against a single point on the surface of the disk directly in front of one of the contact-pieces will only result in pulling the disk farther away from the other contact-piece. It is understood, of course, that the disk is held rigidly at its rim, so that expansion takes place laterally but not in the plane of the disk to any appreciable extent.

My invention is illustrated in the accompanying drawings, in which—

Figure 2:
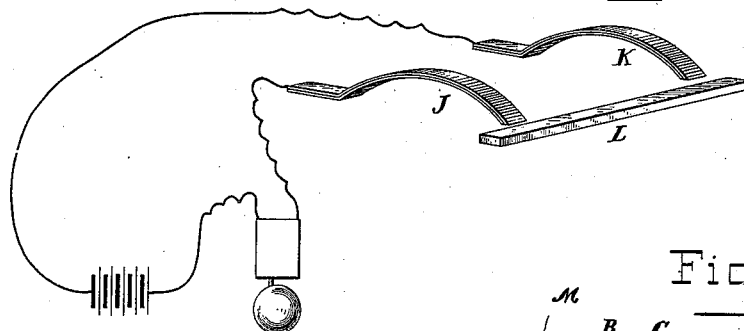
Figure 3:
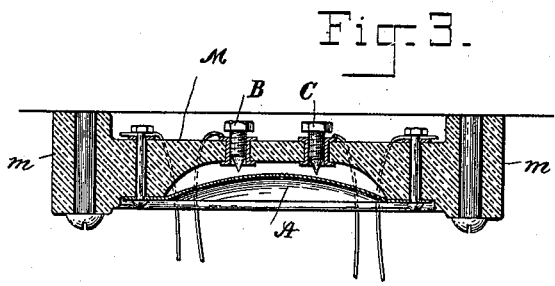
Figure 4:
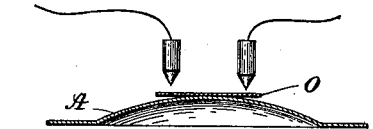

Figure 1 shows diagrammatically an alarm-circuit containing one of my improved thermostats. Fig. 2 is another diagram with a modified form of thermostat. Fig. 3 is a detail of the thermostat shown in Fig. 1, and Fig. 4 illustrates a modification of the thermostat.

The same letters designate the same parts throughout the drawings.

Referring more especially to Fig. 1, A is the expansible portion of my thermostat, which is made in this instance in the form of a concavo-convex disk rigidly secured at its rim and arranged in front of a pair of contact-pieces B and C. One of these contact-pieces, C, is placed somewhat nearer the disk than the other, so that as the disk expands under the influence of heat it would first make contact with C, and then, if the heat is continued, will make contact with D.

The two contact-pieces are connected, respectively, to the poles of an electric battery W, the circuit also containing a gong D and a fire-alarm box E, the latter being of the ordinary type and containing a definite signaling apparatus of the well-known kind.

The contact-piece B is connected to the expansible disk or diaphragm A through an electromagnetic bell F and a local battery G. The other contact-piece C is similarly connected to the disk through the bell H and a local battery I. Now the gong D and the other alarm devices F and H are located preferably at a central station where persons are in attendance, or they may be located at an engine-house through which the current passes. In any case the attendant will be able to distinguish the alarms which come in on the different instruments, and will be able to act accordingly.

Suppose, for example, that an alarm is sounded upon the bell H. The attendant will know at once either that a fire has taken place at the point where the thermostat is located (in which case an alarm may be expected upon the bell F and the gong D in a short time) or that for some reason there is undue heat in the neighborhood of the thermostat, which may not develop into the temperature produced by an actual conflagration, or that the thermostat has been affected by a jar or by malicious handling, so as to make contact between the expansible disk and the contact-piece C. In case the second alarm does not follow within a reasonable period the attendant will know that the alarm was a trouble-signal and will send some one to learn the cause.

It is evident that the alarm-bell H will be sounded as described by the action of the battery I when contact is made between the disk A and the contact-piece C. Similarly, the bell F will be operated by the battery G when contact is made between the disk A and the contact-piece B. Consequently, when the attendant at the central office hears the bell F alone sounding, he will know that there is trouble on that side of the thermostat.

In case of fire the attendant will first hear the bell H and then the bell F and the gong D, which latter will be operated by the battery W as soon as contact is made at both the contact-pieces B and C simultaneously. In case the fire-alarm box E is in circuit a definite number-signal will be struck on the gong, calling out the engine to the scene of the fire. The box E in a simple circuit, as is shown in Fig. 1, may well enough be omitted, but I have inserted it in the drawings simply to illustrate the fact that my thermostat may be applied to city or district systems in which fire-alarm boxes are employed, such systems, for example, as are illustrated in my application for Letters Patent of the United States filed February 18, 1888, Serial No. 264,512.

It is clear that by the use of such a thermostat as I have described distinctive signals can be sent to a central office for indicating trouble at either of the contact-points of a thermostat and for indicating an actual conflagration.

In Fig. 2 I show a different form of thermostat, in which there are two expansible parts instead of one, each part being made up of two substances of different degrees of expansibility, as, for example, hard rubber and brass, or steel and brass. One of the expansible parts is shown as J and the other as K. We may assume that the upper part of the compound bar in each instance is hard rubber and the lower part brass. The coöperating contact-piece L is arranged in such manner as to be nearer the part J than it is to the part K. It is evident that contact will first be made between J and L, but that the circuit will not be completed until contact is also made between K and L.

In Fig. 3 I show the details of construction of the thermostat shown in Fig. 1. The base M is preferably of porcelain and is provided with lugs m m, through which screws are adapted to pass for securing the thermostat to its support.

In Fig. 4 I illustrate a modified form of thermostat which is, however, in most respects identical with that shown in Figs. 1 and 3. Obviously, in such a thermostat the expansion is most rapid at the center of the disk; or, at least, the lateral movement of the disk will be most marked at that point. For that reason I sometimes employ a disk thermostat in which a straight conducting-plate or piece O is secured by a screw or otherwise directly to the center of the disk at the back. The contact-pieces are then placed behind this plate, one being farther away than the other. The principle of action is the same as before.

In describing the contacts as more or less remote from the disk reference is had rather to the relative time required for closing the contact than to actual separation by space. It is possible that a contact-piece located close to the disk, near the edge, might be farther off in time from actual contact, or in degrees of heat, than another placed at a greater distance but in line with the disk's center.

In case I use a closed-circuit thermostat, the difference of time will be secured by causing the contacts at one point to be pressed more or less firmly together than those at another point. Taking a disk form of thermostat, we may suppose B to be pressed more firmly against the disk than C, or a spring which supports B may be free to move farther in following the disk than that which carries C. Both contacts are, of course, pressed against the concave side of the disk.

In a prior application, filed September 21, 1885, Serial No. 177,772, I have shown, described, and claimed a thermostat in which one or more expansible elements is combined with two or more coöperating contact-points, but in the thermostat there described the points are not so adjusted that contact will be made successively. For that reason no means are provided whereby a dangerous or undue heat below that of a conflagration can be indicated, nor are other of the advantages of my present construction at hand.

In view of the above explanation of the term "distance" it is evident that it may mean in the claims which follow the length of time before any change of the circuit, either from an open to a closed condition, or from a closed to an open.

Having described my invention, I claim—

1. In an alarm system, one or more expansible elements and two points of contact coöperating therewith and arranged at different distances from the said expansible element or elements, in combination with a subordinate alarm-circuit connecting the nearer coöperating parts, a subordinate alarm-circuit connecting the more distant coöperating parts, and a main alarm-circuit connecting all the coöperating parts, whereby distinctive signals will be sent on the closing of either contact and of all the contacts, as and for the purpose set forth.

2. In a thermostat, the combination with a concavo-convex disk, confined at its edges, of two or more contact-pieces, coöperating therewith, the said disk and the said contact-pieces having an adjustable relation to each other, as and for the purpose set forth.

3. In a thermostat, the combination with a solid expansible element, of two contact-points in the path of expansion of the said element, one of the said contact-points being nearer to the said expansible element than the other, and the relations of the parts being such that the contact of the expansible element with the more remote contact-point is mechanically resisted by its contact with the nearer point, as and for the purpose set forth.

4. In a thermostat the combination with a concavo-convex disk, held at its edges, of two or more contact-pieces, coöperating therewith, and differentially located with respect to the disk, as and for the purpose set forth.

In testimony whereof I have signed my name, in the presence of two witnesses, this 25th day of March, A. D. 1890.

JOSEPH W. FROST.

Witnesses:
   GEO. B. DUNN,
   G. H. STOCKBRIDGE.